Sept. 23, 1924.
H. G. MacLELLAN
WATER GAUGE FOR AUTO RADIATORS
Filed Nov. 27, 1922
1,509,304
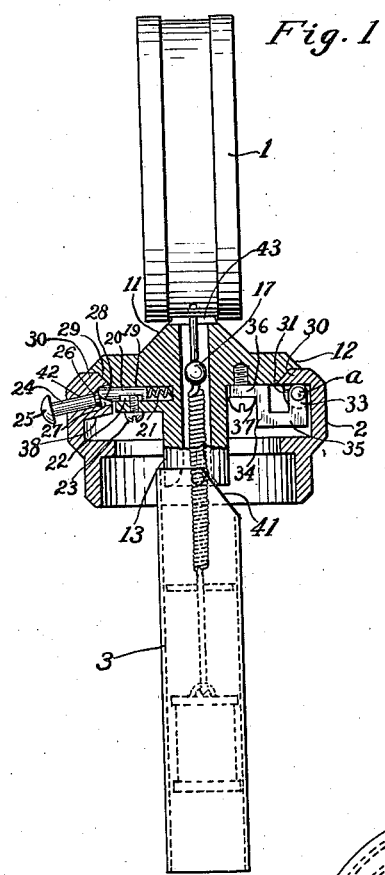
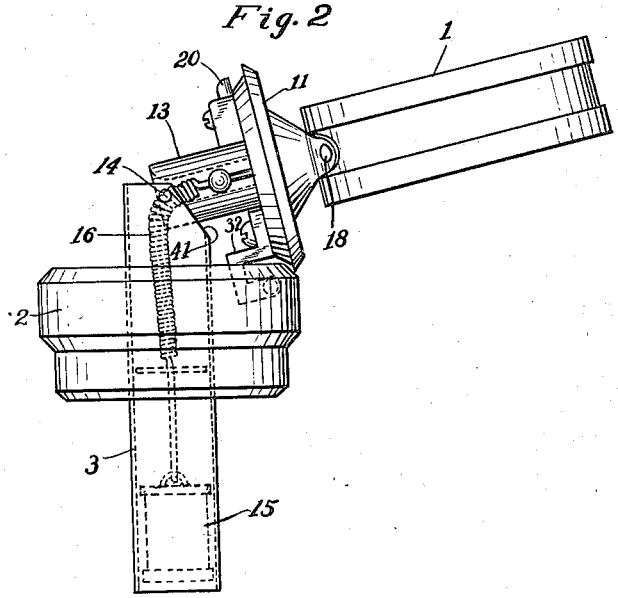
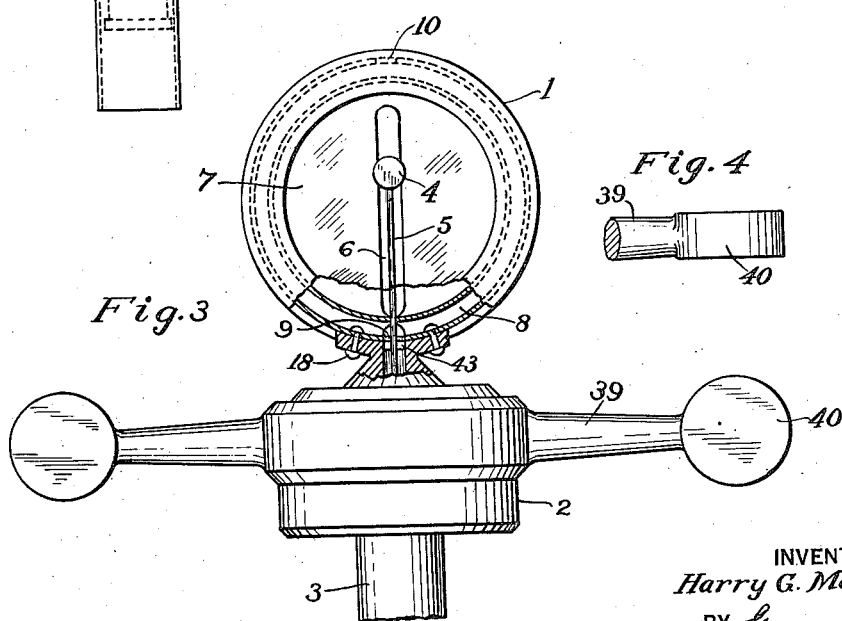
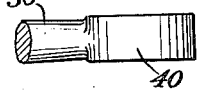
INVENTOR
*Harry G. MacLellan*
BY *Gray and Lilly*
ATTORNEYS.

Patented Sept. 23, 1924.

1,509,304

UNITED STATES PATENT OFFICE.

HARRY GORDON MacLELLAN, OF ANGOLA, INDIANA.

WATER GAUGE FOR AUTO RADIATORS.

Application filed November 27, 1922. Serial No. 603,520.

*To all whom it may concern:*

Be it known that I, HARRY G. MAC-LELLAN, a resident of the city of Angola, county of Steuben, and State of Indiana, and a citizen of the United States of America, have invented certain new and useful Improvements in Water Gauges for Auto Radiators, of which the following is a specification.

This invention relates to water indicators and especially to those used for measuring the depths of liquids in auto radiators. It is especially adaptable to that type of indicators or gauges which are mounted upon the filling tube or spout of the radiator.

It is an object of my invention to provide an indicator disc upon which may be indicated the rising and falling of a suitable float within the radiator corresponding to the level and movement of the liquid. It is to be understood that by constant evaporation of the liquid, the latter must be often re-filled. To do this it is desirable to hinge the cover mounting the head to the handle cap of the instrument so that the head may be inclined and thus to open the filler tube for pouring fresh liquid into the radiator without detaching the gauge from the tube.

It is an object of my invention to provide a concealed and disappearing hinge for movably attaching the head to the fixed part of the tube, so that this hinge will operate efficiently but will not appear externally when the instrument is closed.

Another object of my invention is to provide a concealed spring latch which will hold the cap cover rigidly closed when the head is in the vertical position so that it will not jar open or rattle from the motion of the radiator.

A further object is to conceal the said hinge and latch upon the inside of the cap so that while positive in their action they do not detract from the artistic appearance of the device when seen from the outside.

In the accompanying drawing which forms a part of this specification,

Figure 1 is a side elevation of the indicator, a part of the cover and related elements being shown in section;

Figure 2 is a side elevation of the instrument in which the head and cover are shown in open position;

Figure 3 is a front elevation of the upper part of the device, parts of the dial being broken away, and Figure 4 is a plan view of one of the arm discs.

In the device illustrated 1 designates the dial housing, 2 the barrel or body member upon which the housing member is supported, 3 the float tube secured to an extended part of the housing, 4 the indicating vane which is moved by the rod 5 in a slot 6 in the dial plate.

The main cylindrical housing part or drum 1 comprises a shell, as disclosed in Fig. 3, there being an inner circular chamber in which the indicator 4 may be seen through the protecting transparent plates 7, and an encircling chamber 8 which leads from the lower opening 9 to the upper aperture 10, so that steam or other gases from an overheated radiator may easily escape without clouding the plates 7 within. No further detailed description of the drum will be made in this case, as the claims are not to be directed thereto.

The said drum or housing is mounted on a cover member 11 which is hinged at $a$ to the barrel member 2, the parts being correspondingly beveled to fit tightly, and the former provided with an anular over-lapping flange or lip 12 to further secure a tight joint. As the said barrel is to be detachably secured to the filler flange of an auto radiator, it is evident that the indicator drum together with its supporting parts may readily be removed from or attached to a radiator as a unit. The hinging of the base plate or cover 11 to the barrel, however, provides for swinging the drum and plate over to one side, and refilling the radiator down through the barrel 2 without removing the latter from the filler flange.

The plate 11 is provided with an axially and downwardly directed hub or tube 13 to which the float tube 3 is pivoted at 14 for obvious reasons. Within this tube is the float 15 which is connected with the rod 5 by means comprising a flexible and elastic spring 16 and a ball 17. The drum is riveted at 18 to flanges on the cover member 11, and the latter as well as its hub 13 is bored to permit the connection to loosely pass therethrough.

It is very desirable in these instruments to so mount them that there shall be no rattling of the drum and cover on the barrel and it is almost equally important that no latch be shown on the exterior of the parts; and to this end I have devised an inner latch or fastener which is certain in its action, and at the same time requires no outside mechanism for locking the parts, and only a thumb actuated button for releasing. Within the cover plate is provided a radial slot 19 in an horizontal plane and fitted to receive therein a latch pin 20 normally urged outwardly by a thrust spring 21. The pin 20 is provided on its lower side with a slot 22 into which extends the tip of a small screw 23 mounted in the cover wall to limit the endwise movement of the pin. When the latter is thrust outwardly to its limit, its projecting end will be positioned in an aperture in the wall of the barrel under the edge of the barrel flange, and thus lock the cover closed. When, however, the pin is moved inward against the force of the spring 21, the latch is released. To accomplish the latter movement, a release pin 24 is mounted within the said aperture in the wall of the barrel, and almost in alignment with the pin 20, the outer end having a push button enlargement 25 thereon, and the inner end having a slightly flanged end 26 to prevent the accidental loss thereof. The barrel wall may be provided with a protuberance on its inner face as at 38 to strengthen the pin and latch carrier.

To effect the ready automatic latching of the cover by pressure on the top face thereof, the lower side of the outer end of the pin 20 is beveled at 28 which, pressing against the bevel edge 29 of the barrel wall, forces the said pin inwardly until the overhanging edge or flange 30 is passed, when the spring 21 latches the cover as before explained.

The cover is pivoted to the barrel by a concealed hinge which will now be described in detail. Projecting from the under face of the aforesaid edge 30 is a perforated ear or lug 31. A metal hinge bar 32 is made up of two arms 33 and 34 united at their base by a bridge piece 35 to form a U, so that the edge 30 may be straddled by the hinge when the cover is opened. See Fig. 2. The upper end of the arm 33 is slit in a plane parallel to the length of the hinge to form a smaller U which receives therein the said ear 31, and the parts are then pivoted by the said pin a. The upper end of the arm 34 has an angular extension 36 whereby it may be attached to the lower face of the cover plate by a screw 37, and thus the hinge mechanism is wholly concealed when the cover is closed.

Assuming now that the instrument is in the closed position, and that it is desired to refill the radiator, an inward pressure is exerted on the head of the pin 24 which will move the pin 20 inwardly against the force of the spring 21 until the end of the pin 20 clears the flange 30, when the cover or supporting base member 11 together with the drum carried by it may readily be inclined to one side as shown in Fig. 2. As this is done, the hub 13 swings on the pivot 14 so that the tube 3 can remain in a vertical position though the hub 13 is inclined. The beveled edge 41 of said tube co-operates with suitably cut away parts of the hub to more easily accommodate such movement. In the inclined position, the float 15 remains in the tube, the spring 16 bending as may be required to permit hinging of the parts of the tube. In this open position of the cover the liquid may readily be poured down through the open barrel into the radiator without removing the instrument from the filler flange of the radiator.

When the refilling operation is complete, a slight force exerted upon the cover will return the drum to vertical position, and latch the cover in closed position as before explained. It is further to be noted, however, that the action of the latch pin 20 which I have devised is peculiar in the manner in which it is capable of tightly holding the cover down and preventing rattling of the parts, as above stated, the aperture 42 in the barrel wall for receiving the pin 24 is almost in alinement with the pin 20, but it is not quite in alinement. Said aperture is inclined slightly downwardly from the plane of the pin 20, and this results in the outward thrust of the latter tending to draw the cover 11 down tightly on the barrel. The greater the force of the spring 21, the tighter is the cover pressed against the body or barrel upon which it rests. This by no means interferes with the easy release of the latch when it is desired, but provides a very positive and at the same time automatic latch which is wholly concealed within the cover of the instrument.

As a further means of positively preventing the passage of steam or vapor into the dial chamber, under conditions of overheated motor, a transverse opening 43 intersects the supporting base 11 for the drum 1 just beneath the latter, as shown in Figs. 1 and 3, this opening intersecting also the vertical slot in which the rod 5 moves. Since this slot intersects the annular chamber 8, a direct passage is afforded from 43 into 8 and thence to the upper opening 10. This permits passage of the outer air directly through opening 43 from one side to the other, thus cooling the vapor rising from the radiator and condensing the same more or less before entering the drum head.

The above described construction not only permits the air to pass through said opening 43, but also permits passage of the air into said openings, thence around the drum through the channel in the wall and out through aperture 10. Excess of steam or other hot vapors from the radiator may also pass out through the openings 43 when pressure so tends to produce that course.

From the barrel member 2 extends the usual arms 39 for manual operation, but in my device the ends of the arms are provided with flat discs 40 rather than the balls hitherto used on such instruments. These fittings serve to produce a more ornamental effect that harmonizes with the indicator head here shown, and the combined instrument also harmonizes with the new drum head lights now being used on many cars, in symmetry and arrangement.

While I have here illustrated my hinged instrument on which the improved and concealed latch and hinge are applied, as a water gauge, I desire by no means to limit myself to these particular instruments. Said latch and hinge may be obviously used on other instruments where positiveness of action and quiet movement as well as artistic appearance of the exterior is a requisite and I desire to claim my improvements as herein recited, in their broad application, and not restricted to the particular embodiment here shown.

No particular manner of attaching the instrument to a filler flange is disclosed, as many forms of such attachment are known and used. The barrel member here disclosed has a depending flange which may be threaded, if desired, for attaching to the said filler flange of a radiator; but many other forms will suggest themselves.

Having thus described my invention, what I claim as new and desire to secure by Letters Patent, is,—

1. In combination, a liquid gauge and mounting therefor comprising a flanged barrel member adapted to be attached to the filler flange of an auto radiator, a cover member for the filling passage carrying the gauge, means within the said cover and barrel members for pivoting one to the other so that the radiator may be filled by tipping the cover and gauge to one side without dismounting them and the pivoting means is wholly concealed when the cover is closed, and means within the cover for latching the same in its closed position.

2. In combination, a liquid gauge and mounting therefor comprising a barrel member adapted to be attached to the filler flange of an auto radiator, and having a radially over-hanging annular flange on its upper edge, said last-mentioned flange having an annular beveled edge, a cover for the filling passage carrying the gauge and having an external beveled edge adapted to fit the beveled edge of, the said barrel flange and an over-lapping lip covering the beveled joint between the barrel and cover, means within the said cover and barrel parts for pivoting one to the other so that the radiator may be filled by tipping the cover and gauge to one side without dismounting them, and latching means within the cover for tending to tightly close the said beveled joint and the lip thereover when the cover is closed.

3. In combination, a liquid gauge and mounting therefor comprising a flanged barrel member adapted to be attached to the filler flange of an auto radiator, a cover for the filling passage carrying the gauge, means within the said cover and barrel parts for pivoting one to the other so that the radiator may be filled by tipping the cover and gauge to one side without dismounting them and the pivoting means is wholly concealed when the cover is closed, and latching means within the cover and barrel parts comprising a locking bolt, the cover having a radial slot opening outwardly to its edge and below the upper surface thereof and receiving the bolt therein, a compression spring in said slot behind the bolt and tending to thrust the bolt beyond the edge of the cover, a releasing bolt seated within an opening through the barrel wall and normally in contact with the end of the locking bolt, whereby the locking bolt may enter said opening to latch the cover in closed position, and inward thrust of the releasing bolt will push back the locking bolt and unlatch the cover.

4. In combination, an indicating instrument comprising an indicating element and a controlling element connected by a flexible member, a mounting mechanism for the instrument comprising an annular member having an inwardly turned flange at its upper end and a cover for said annular member, the said indicating element being mounted on the cover and the controlling element depending from the indicating element within said annular element, an angular shaped hinge attached to the parts of the mounting mechanism within the cover and annular member whereby the angular part of the hinge will encompass the said flange when the cover is open, and will be wholly concealed when the cover is closed, and an inner concealed latch carried by said cover for latching the same to the annular member.

5. In combination, a liquid gauge comprising a dial, a float, and means for indicating on the dial movements of the float, mounting means for the gauge comprising a barrel member adapted to be attached to the filler flange of an auto radiator and a cover member carrying the dial, means concealed within the cover and barrel member for pivoting one to the other, so that the cover may be swung open to permit pouring liquid through the barrel into the radiator, and means for latching the cover in its closed position comprising a slidable locking bolt, a spring normally urging the bolt radially outwardly in the plane of the cover, there being an aperture through the barrel wall slightly inclined from true alinement with said locking bolt, a releasing bolt in said aperture, whereby the locking bolt may enter said inclined aperture to latch the cover in tightly closed position, and inward thrust of the releasing bolt will push back the locking bolt and unlatch the cover.

6. In combination, an annular member, a cover, a hinge concealed within the cover and annular member for pivoting one to the other so that the cover may be opened, and means for latching the cover in its closed position comprising a locking bolt slidable in a radial slot within the cover, a spring normally urging said bolt outwardly in said slot, there being an aperture through the barrel wall slightly inclined from true alinement with said locking bolt, a releasing bolt in said aperture whereby the locking bolt when urged outwardly by the spring enters the inclined wall of the said aperture and tends to tightly close the cover upon the annular member, and inward thrust of the releasing bolt will push back the locking bolt and unlatch the cover.

7. In combination, an annular member having an inwardly turned flange lip at its upper end, a cover for said annular member overlapping said flange, a hinge mechanism for pivoting the cover to said annular member comprising an apertured lug extending downwardly from said flange and within the annulus, and an angular hinge bar comprising a U-shaped section one arm of which has a split end adapted to straddle said lug and apertured to aline with the opening therein, and the other arm having an angular extension with means for securing the same to the lower face of the cover, whereby the U part of the bar will encase the edge of the flange when the cover is swung open, and will be wholly concealed when the cover is closed.

8. A disappearing hinge mechanism for pivoting a part upon a hollow device having an inturned flange, comprising a U-shaped bar, the end of one of the arms of the U being divided to form spaced ears which have alined openings, and the other arm having a bent extension for securing the hinge U to the said pivoted part, an apertured lug member adapted to be secured to and beneath the said flange, and to fit the slot in the said bar, and a pin seated in the lug member and bar apertures, whereby the U part of the bar will encase the said flange when the pivoted part is raised, and be whooly concealed when the pivoted part is lowered.

9. In combination, a liquid gauge including a drum comprising spaced concentric rings forming therebetween an annular passage, said drum having an upper opening communicating with said passage, a dial within the innermost ring, mounting means for the gauge comprising a barrel member adapted to be attached to the filler flange of an auto radiator, a cover member hinged to the barrel member and affording a supporting base for the drum on the cover, a float within the radiator, the cover member having a vertical aperture therethrough in axial alinement with said barrel member and affording communication between the radiator and said annular passage, a flexible element connecting the float and the dial whereby they will not be injured when the cover is opened, there being a transverse opening through said supporting base just beneath the drum and intersecting said vertical aperture, whereby free current of air and other gases is permitted through said openings, aperture and passage to condense the vapor in the drum and base and thus avoid dimming the dial, and means concealed within said barrel for latching the cover closed.

In testimony whereof I hereunto affix my signature.

HARRY GORDON MacLELLAN.